US008960151B2

(12) United States Patent
Grover, Jr. et al.

(10) Patent No.: US 8,960,151 B2
(45) Date of Patent: Feb. 24, 2015

(54) HCCI FUEL INJECTORS FOR ROBUST AUTO-IGNITION AND FLAME PROPAGATION

(75) Inventors: Ronald O. Grover, Jr., Northville, MI (US); Hanho Yun, Oakland Township, MI (US); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 399 days.

(21) Appl. No.: 13/432,016

(22) Filed: Mar. 28, 2012

(65) Prior Publication Data

US 2012/0255517 A1    Oct. 11, 2012

Related U.S. Application Data

(60) Provisional application No. 61/472,580, filed on Apr. 6, 2011.

(51) Int. Cl.

| F02M 45/02 | (2006.01) |
|---|---|
| F02B 23/10 | (2006.01) |
| F02M 69/04 | (2006.01) |
| F02D 13/02 | (2006.01) |
| F02B 1/12 | (2006.01) |
| F02D 19/08 | (2006.01) |
| F02D 35/02 | (2006.01) |
| F02D 41/00 | (2006.01) |

(52) U.S. Cl.
CPC .............. F02M 45/02 (2013.01); F02B 23/101 (2013.01); F02B 23/104 (2013.01); F02M 69/045 (2013.01); F02D 13/0207 (2013.01); F02D 13/0219 (2013.01); F02D 13/0265 (2013.01); *Y02T 10/128* (2013.01); *F02B 1/12* (2013.01); *F02D 19/084* (2013.01); *F02D 35/023* (2013.01); *F02D 35/028* (2013.01); *F02D 2041/001* (2013.01); *Y02T 10/18* (2013.01); *Y02T 10/125* (2013.01)
USPC ............................................ 123/298; 123/305

(58) Field of Classification Search
CPC .... F02B 23/101; F02B 23/104; F02B 23/105; F02M 61/1813; F02M 61/182; F02M 45/086
USPC .............................. 123/298, 305; 239/533.12
See application file for complete search history.

(56) References Cited

U.S. PATENT DOCUMENTS

| 4,919,093 | A  | * | 4/1990  | Hiraki et al.      | 123/299 |
|---|---|---|---|---|---|
| 5,058,549 | A  | * | 10/1991 | Hashimoto et al.   | 123/298 |
| 5,775,289 | A  | * | 7/1998  | Yoshida et al.     | 123/305 |
| 6,553,960 | B1 | * | 4/2003  | Yoshikawa et al.   | 123/299 |
| 6,622,693 | B2 | * | 9/2003  | Arndt et al.       | 123/299 |
| 6,644,268 | B2 | * | 11/2003 | Konig et al.       | 123/299 |

(Continued)

FOREIGN PATENT DOCUMENTS

DE    10026324 A1    11/2001

*Primary Examiner* — Hai Huynh

(57) ABSTRACT

A direct injection engine includes a fuel injector receiving a flow of pressurized fuel. The fuel injector provides fuel injections directly into a combustion chamber of the engine. The fuel injector includes a first fuel injector nozzle opening directing with a first narrow injection angle a first portion of a fuel injection mass at a spark gap of a spark plug. The fuel injector further includes a second fuel injector nozzle opening dispersing with a second wider injection angle a second portion of the fuel injection mass within the combustion chamber.

15 Claims, 6 Drawing Sheets

(56) References Cited

U.S. PATENT DOCUMENTS

| | | |
|---|---|---|
| 6,971,365 B1 | 12/2005 | Najt et al. |
| 7,104,247 B2 * | 9/2006 | Hiraya et al. ............. 123/276 |
| 7,198,024 B2 * | 4/2007 | Coleman et al. ........... 123/305 |
| 7,527,033 B2 * | 5/2009 | Okada et al. .............. 123/298 |
| 7,740,002 B2 * | 6/2010 | Zeng et al. ............... 123/305 |
| 2004/0011323 A1 * | 1/2004 | Hilger et al. ............. 123/298 |
| 2004/0011324 A1 * | 1/2004 | Arndt et al. .............. 123/299 |
| 2004/0020459 A1 * | 2/2004 | Arndt et al. .............. 123/305 |
| 2006/0254560 A1 * | 11/2006 | Mann et al. ............... 123/305 |

\* cited by examiner

HCCI FUEL INJECTORS FOR ROBUST AUTO-IGNITION AND FLAME PROPAGATION

CROSS REFERENCE TO RELATED APPLICATIONS

This application claims the benefit of U.S. Provisional Application No. 61/472,580, filed on Apr. 6, 2011, which is incorporated herein by reference.

TECHNICAL FIELD

This disclosure is related to fuel injection in an internal combustion engines.

BACKGROUND

The statements in this section merely provide background information related to the present disclosure. Accordingly, such statements are not intended to constitute an admission of prior art.

Known spark-ignition (SI) engines introduce an air/fuel mixture into each cylinder which is compressed in a compression stroke and ignited by a spark plug. Known compression ignition engines inject pressurized fuel into a combustion cylinder near top dead center (TDC) of the compression stroke which ignites upon injection. Combustion for both gasoline engines and diesel engines involves premixed or diffusion flames controlled by fluid mechanics.

SI engines can operate in a variety of different combustion modes, including a homogeneous SI combustion mode and a stratified-charge SI combustion mode. SI engines can be configured to operate in a homogeneous-charge compression-ignition (HCCI) combustion mode, also referred to as controlled auto-ignition combustion, under predetermined speed/load operating conditions. The HCCI combustion mode includes a distributed, flameless, auto-ignition combustion process that is controlled by oxidation chemistry. An engine operating in the HCCI combustion mode has a cylinder charge that is preferably homogeneous in composition, temperature, and residual exhaust gases at intake valve closing time. HCCI combustion is a distributed kinetically-controlled combustion process with the engine operating at a dilute air/fuel mixture, i.e., lean of a stoichiometric air/fuel point, with relatively low peak combustion temperatures, resulting in low NOx emissions. The homogeneous air/fuel mixture minimizes occurrences of rich zones that form smoke and particulate emissions.

Operation in HCCI combustion mode, wherein combustion occurs based upon compression of the charge to a point of substantially uniform combustion throughout the combustion chamber, is highly dependent upon conditions within the combustion chamber. If insufficient heat and/or pressure is present within the combustion chamber, the charge may fail to ignite or may misfire, resulting in unstable combustion or a drop in efficiency of combustion. If excessive heat and/or pressure is present within the combustion chamber, the charge may combust before the intended start of combustion, resulting in disorderly combustion or ringing in the cylinder.

An engine operating in HCCI combustion mode can be operated in a spark assist mode, wherein air and fuel are introduced to the combustion chamber in proportion to operation in the HCCI combustion mode, while a spark from a spark plug is utilized in advance of anticipated auto-combustion to ensure proper combustion.

SUMMARY

A direct injection engine includes a fuel injector receiving a flow of pressurized fuel. The fuel injector provides fuel injections directly into a combustion chamber of the engine. The fuel injector includes a first fuel injector nozzle opening directing with a first narrow injection angle a first portion of a fuel injection mass at a spark gap of a spark plug. The fuel injector further includes a second fuel injector nozzle opening dispersing with a second wider injection angle a second portion of the fuel injection mass within the combustion chamber.

BRIEF DESCRIPTION OF THE DRAWINGS

One or more embodiments will now be described, by way of example, with reference to the accompanying drawings, in which:

FIG. 2 illustrates a wider injection angle and a narrower injection angle, depicting a heat release rate through a combustion cycle;

FIG. 3 illustrates the wider injection angle and narrower injection angle of FIG. 2, depicting IMEP through a series of combustion cycles wherein spark assist has minimal influence to aid combustion in HCCI combustion mode;

FIG. 4 illustrates a wider injection angle and a narrower injection angle, depicting a heat release rate through a combustion cycle;

FIG. 5 illustrates the wider injection angle and narrower injection angle of FIG. 4, depicting IMEP through a series of combustion cycles wherein spark assist is utilized to aid combustion in HCCI combustion mode;

DETAILED DESCRIPTION

Figure 1:
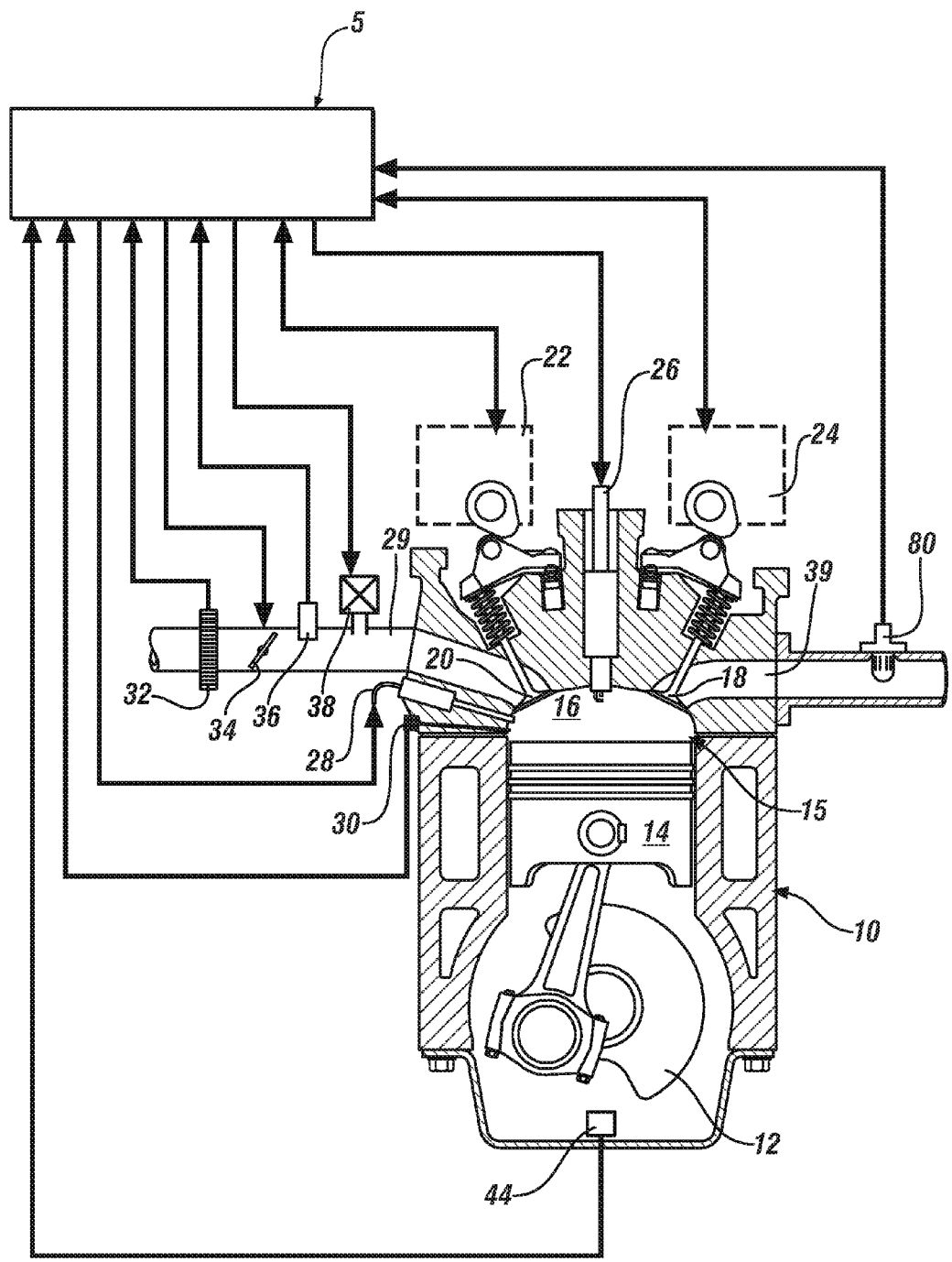
FIG. 1 illustrates an internal combustion engine 10 and accompanying control module 5, in accordance with the present disclosure.

Referring now to the drawings, wherein the showings are for the purpose of illustrating certain exemplary embodiments only and not for the purpose of limiting the same, FIG. 1 schematically illustrates an internal combustion engine 10 and accompanying control module 5. The engine 10 is selectively operative in a controlled auto-ignition combustion mode, a homogeneous spark-ignition combustion mode, a stratified-charge spark-ignition combustion mode, or a stratified-charge compression ignition mode.

The exemplary engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which their linear reciprocating motion is translated to rotational motion. An air intake system provides intake air to an intake manifold 29 which directs and distributes air into an intake runner to each combustion chamber 16. The air intake system comprises airflow ductwork and devices for monitoring and controlling the air flow. The air intake devices preferably include a mass airflow sensor 32 for monitoring mass airflow and intake air temperature. A throttle valve 34 preferably comprises an electronically controlled device which controls air flow to the engine 10 in response to a control signal (ETC) from the control module 5. A pressure sensor 36 in the manifold is adapted to monitor manifold absolute pressure and barometric pressure. An external flow passage recirculates exhaust gases from engine exhaust to the intake manifold, having a flow control valve, referred to as an EGR valve 38. The control module 5 is operative to control mass flow of exhaust gas to the intake manifold 29 by controlling opening of the EGR valve 38. Engines may receive naturally aspirated intake air or air drawn in through the intake system through the pumping action of the engine. Engines alternatively can receive charged intake air or intake air pressurized by a turbocharger or supercharger device. The fuel injector configurations and methods disclosed herein can operate with either naturally aspirated or charged intake air, and the disclosure is not intended to be limited to the particular exemplary embodiments provided herein.

Air flow from the intake manifold 29 into each of the combustion chambers 16 is controlled by one or more intake valves 20. Flow of combusted gases from each of the combustion chambers 16 to an exhaust manifold 39 is controlled by one or more exhaust valves 18. Openings and closings of the intake and exhaust valves 20 and 18 are preferably controlled with a dual camshaft (as depicted), the rotations of which are linked and indexed with rotation of the crankshaft 12. The engine 10 is equipped with devices for controlling valve lift of the intake valves and the exhaust valves, referred to as variable lift control (VLC) devices. The variable lift control devices in this embodiment are operative to control valve lift, or opening, to one of two distinct steps, e.g., a low-lift valve opening (about 4-6 mm) for low speed, low load engine operation, and a high-lift valve opening (about 8-10 mm) for high speed, high load engine operation. The engine is further equipped with devices for controlling phasing (i.e., relative timing) of opening and closing of the intake and exhaust valves 20 and 18, referred to as variable cam phasing (VCP), to control phasing beyond that which is effected by the two-step VLC lift. There is a VCP/VLC system 22 for the intake valves 20 and a VCP/VLC system 24 for the engine exhaust valves 18. The VCP/VLC systems 22 and 24 are controlled by the control module 5, and provide signal feedback to the control module 5, for example through camshaft rotation position sensors for the intake camshaft and the exhaust camshaft. When the engine 10 is operating in the HCCI combustion mode with an exhaust recompression valve strategy, the VCP/VLC systems 22 and 24 are preferably controlled to the low lift valve openings. When the engine is operating in the homogeneous spark-ignition combustion mode, the VCP/VLC systems 22 and 24 are preferably controlled to the high lift valve openings to minimize pumping losses. When operating in the HCCI combustion mode, low lift valve openings and negative valve overlap may be commanded to generate reformates in the combustion chamber 16. There may be a time lag between a command to change cam phasing and/or valve lift of one of the VCP/VLC systems 22 and 24 and execution of the transition due to physical and mechanical properties of the systems.

The intake and exhaust VCP/VLC systems 22 and 24 have limited ranges of authority over which opening and closing of the intake and exhaust valves 18 and 20 may be controlled. VCP systems may have a range of phasing authority of about 60°-90° of cam shaft rotation, thus permitting the control module 5 to advance or retard valve opening and closing. The range of phasing authority is defined and limited by the hardware of the VCP and the control system which actuates the VCP. The intake and exhaust VCP/VLC systems 22 and 24 may be actuated using one of electro-hydraulic, hydraulic, and electric control force, controlled by the control module 5. Valve overlap of the intake and exhaust valves 20 and 18 refers to a period defining closing of the exhaust valve 18 relative to an opening of the intake valve 20 for a cylinder. The valve overlap may be measured in crank angle degrees, wherein a positive valve overlap (PVO) refers to a period wherein both the exhaust valve 18 and the intake valve 20 are open and a negative valve overlap (NVO) refers to a period between closing of the exhaust valve 18 and subsequent opening of the intake valve 20 wherein both the intake valve 20 and the exhaust valve 18 are closed. When operating in the HCCI combustion mode, the intake and exhaust valves may have a NVO as part of an exhaust recompression strategy. In a SI-homogeneous combustion mode the intake and exhaust valves may have a NVO, but more typically will have a PVO.

The engine 10 includes a fuel injection system, including a plurality of high-pressure fuel injectors 28 each adapted to directly inject a mass of fuel into one of the combustion chambers 16, in response to a signal (INJ_PW) from the control module 5. The fuel injectors 28 are supplied pressurized fuel from a fuel distribution system.

The engine 10 includes a spark-ignition system by which spark energy is provided to a spark plug 26 for igniting or assisting in igniting cylinder charges in each of the combustion chambers 16 in response to a signal (IGN) from the control module 5. The spark plug 26 may enhance the ignition process of the engine at certain conditions such as for the HCCI combustion mode (e.g., during cold engine conditions and near a low load operation limit). Combustion ignited by the spark-ignition system and the properties thereof are dependent upon a number of factors including a composition and distribution of fuel and air within the combustion chamber. An adequate or increased concentration of a spray of fuel around the spark plug gap can facilitate robust combustion.

The engine 10 is equipped with various sensing devices for monitoring engine operation, including monitoring crankshaft rotational position, i.e., crank angle and speed. Sensing devices include a crankshaft rotational speed sensor (crank sensor) 44, a combustion sensor 30 adapted to monitor combustion and an exhaust gas sensor 80 adapted to monitor exhaust gases, for example using an air/fuel ratio sensor. The combustion sensor 30 comprises a sensor device operative to monitor a state of a combustion parameter and is depicted as a cylinder pressure sensor operative to monitor in-cylinder combustion pressure. The outputs of the combustion sensor 30, the exhaust gas sensor 80 and the crank sensor 44 are monitored by the control module 5 which determines combustion phasing, i.e., timing of combustion pressure relative to the crank angle of the crankshaft 12 for each cylinder 15 for each combustion cycle. The combustion sensor 30 may also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems may be used to monitor states of other combustion parameters within the scope of the disclosure, e.g., ion-sense ignition systems, and non-intrusive cylinder pressure sensors.

The engine 10 is designed to operate un-throttled on gasoline or similar fuel blends in the controlled auto-ignition combustion mode over an extended area of engine speeds and loads. However, spark-ignition and throttle-controlled operation may be utilized under conditions not conducive to the controlled auto-ignition combustion mode and to obtain maximum engine power to meet an operator torque request with engine power defined by the engine speed and load. Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used. Methods disclosed herein can be utilized with any of the mentioned fuels. Additionally, methods disclosed herein can be utilized in engines utilizing other fuels, for example, diesel fuel, in configurations wherein a spark plug is utilized. Operation in an HCCI combustion mode is disclosed with relation to methods herein; however, the methods disclosed can be utilized with other combustion modes wherein auto-ignition is utilized.

The control module 5 executes routines stored therein to control the aforementioned actuators to control engine operation, including throttle position, spark timing, fuel injection mass and timing, intake and/or exhaust valve timing and phasing, and EGR valve position to control flow of recirculated exhaust gases. Valve timing and phasing may include predetermined valve overlap, including NVO and low lift of the intake and exhaust valves 20 and 18 in an exhaust re-breathing strategy. The control module 5 is adapted to receive input signals from an operator, e.g., from a throttle pedal position and a brake pedal position, to determine an operator torque request, and from the sensors indicating the engine speed, intake air temperature, coolant temperature, and other ambient conditions.

The control module 5 is an element of an overall vehicle control system, preferably comprising a distributed control module architecture operable to provide coordinated system control. The control module 5 is operable to synthesize pertinent information and inputs from the aforementioned sensing devices, and execute algorithms to control various actuators to achieve control of fuel economy, emissions, performance, drivability, and protection of hardware, as described hereinbelow.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Properties of combustion within the combustion chamber depend upon a number of factors including how the fuel is injected into the combustion chamber. A fuel injector can inject fuel with injection holes configured to release fuel with different spray properties. For example, an injector can include a hole configured to release fuel in a spray envelope with a relatively wide spray angle, for example, a spray angle of 90 degrees or an injector can include a hole configured to release fuel in a spray envelope with a relatively narrow spray angle, for example, a spray angle of 60 degrees. Different spray envelopes or resulting spray patterns change properties of the resulting combustion. For example, a wider spray pattern can facilitate a rapid and substantially uniform combustion process in HCCI combustion mode. By distributing fuel widely throughout the combustion chamber, fuel and oxygen can be combusted evenly throughout the chamber. However, in conditions wherein insufficient heat is present in the combustion chamber and spark assist is utilized to initiate combustion, a sufficient concentration of fuel proximate to the spark plug can be important to efficient flame propagation from the spark and resulting stability in the combustion. A narrower spray envelope can be utilized to direct a concentration of fuel to a spark gap of the spark plug to aid in combustion stability. At least one fuel injector hole at the tip of the fuel injector can direct a first portion of a fuel injection mass at a first narrow injection angle toward the spark plug, and at least one fuel injector hole at the tip of the fuel injector can disperse a second portion of the fuel injection mass throughout the combustion chamber.

Figure 2:
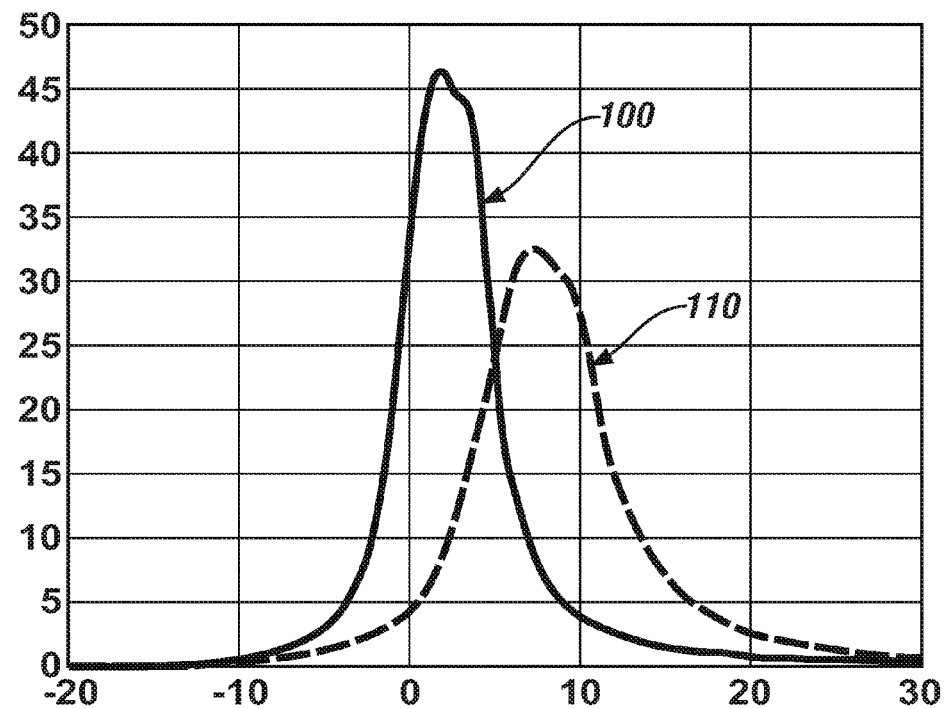
FIGS. 2 and 3 illustrate results recorded during testing of physical components, wherein conditions within the combustion chamber do not require spark assist for robust auto-ignition, in accordance with the present disclosure.
Figure 3:
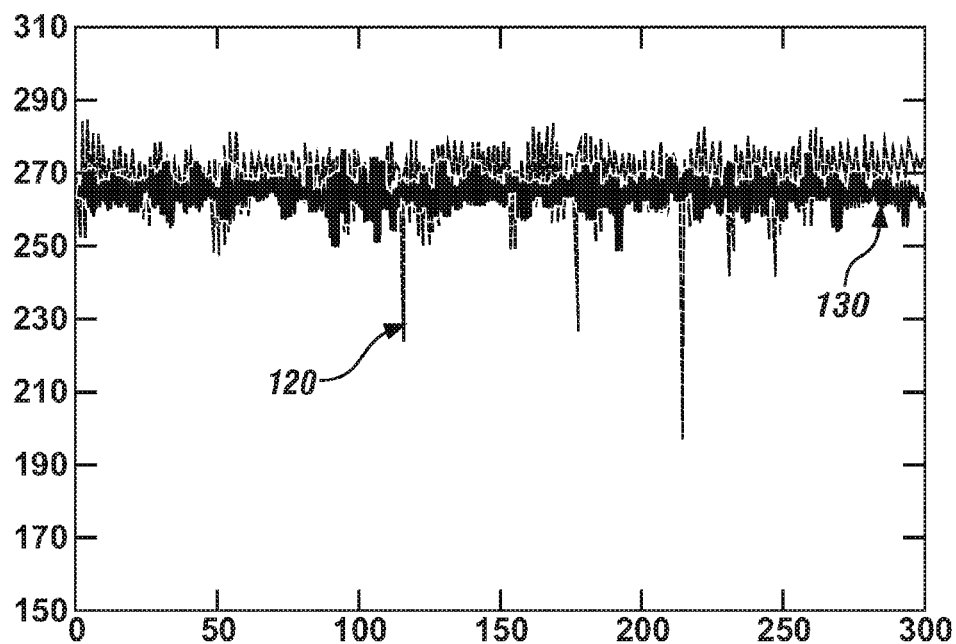

FIGS. 2 and 3 illustrate combustion results recorded during testing of physical components, wherein conditions within the combustion chamber do not require spark assist for robust auto-ignition. FIG. 2 graphically illustrates a wider injection angle and a narrower injection angle, depicting a heat release rate through a combustion cycle. The vertical y-axis depicts the heat release rate of the combustion cycle in J/deg, and the horizontal x-axis depicts progression of the combustion cycle as a crank angle of the crankshaft in degrees after top dead center, wherein zero degrees after top dead center signifies the point at which the piston reaches its highest point of travel within the cylinder. Fuel is injected with a wider injection angle of 90 degrees in one set of experiments and the fuel is injected with a narrower injection angle of 60 degrees in another set of experiments, with both injections having a same start of injection timing. Plot 100 illustrates the resulting combustion of the wider injection angle and plot 110 illustrates the resulting combustion of the narrower injection angle. Plot 100 illustrates a more rapid and complete combustion event, wherein the dispersed fuel throughout the combustion chamber permits rapid and thorough combustion of the fuel with oxygen throughout the combustion chamber.

FIG. 3 graphically illustrates the wider injection angle and narrower injection angle of FIG. 2, depicting IMEP through a series of combustion cycles wherein spark assist has minimal influence to aid combustion in HCCI combustion mode. The vertical y-axis depicts IMEP of the combustion cycle in kPa, a measure of how much work is performed by the combustion cycle, and the horizontal x-axis depicts a series of sequential combustion cycles through which the IMEP values are collected. Plot 120 illustrates the resulting combustion of the narrower injection angle and plot 130 illustrates the resulting combustion of the wider injection angle. Plot 120 illustrates substantial variation in the work output of the resulting combustion, whereas plot 130, associated with the more wider injection angle, illustrates more consistent IMEP values through the combustion cycles due to even onset of auto-ignition.

Figure 4:
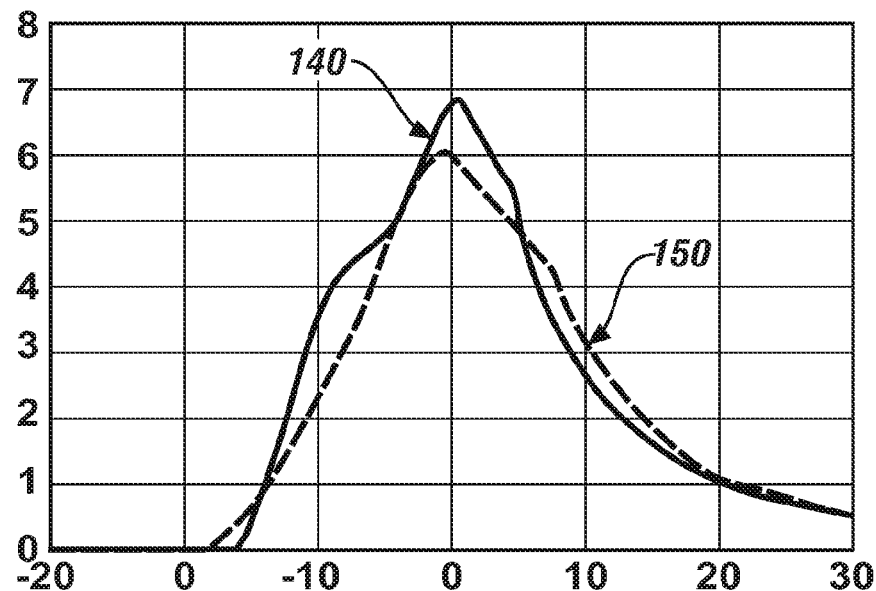
FIGS. 4 and 5 illustrate results recorded during testing of physical components, wherein conditions within the combustion chamber lack sufficient energy for robust auto-ignition and benefit from spark assist, in accordance with the present disclosure.
Figure 5:
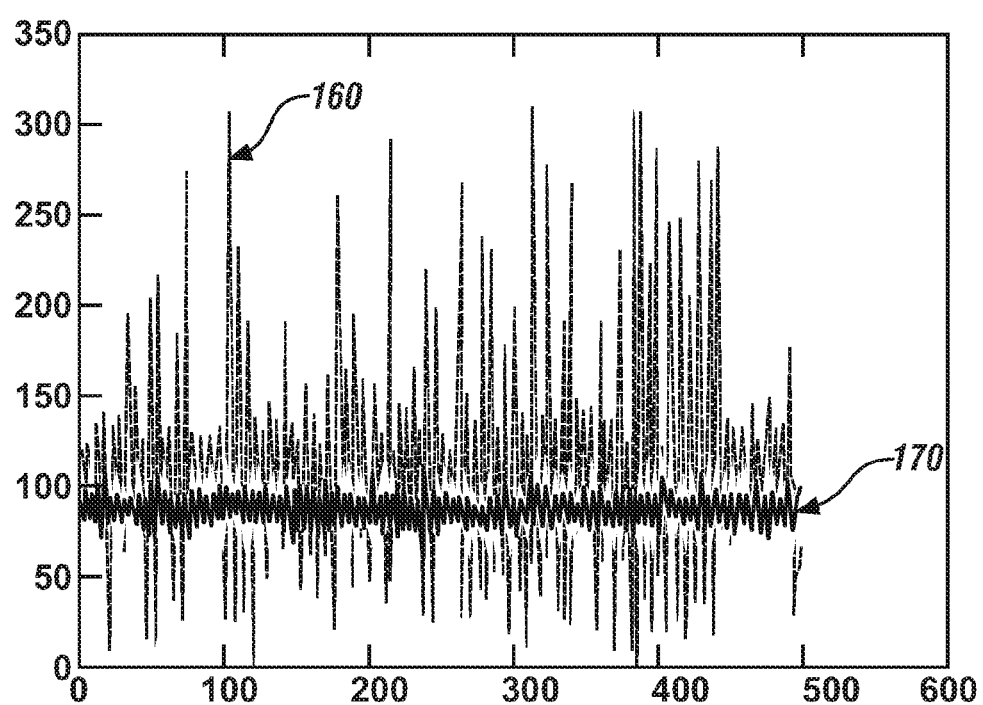

FIGS. 4 and 5 illustrate results recorded during testing of physical components, wherein conditions within the combustion chamber lack sufficient energy for robust auto-ignition and benefit from spark assist. FIG. 4 graphically illustrates a wider injection angle and a narrower injection angle, depicting a heat release rate through a combustion cycle. The vertical y-axis depicts the heat release rate of the combustion cycle in J/deg, and the horizontal x-axis depicts progression of the combustion cycle as a crank angle of the crankshaft in degrees after top dead center. Fuel is injected with a wider injection angle of 90 degrees in one set of experiments and fuel is injected with a narrower injection angle of 60 degrees in another set of experiments, with both injections having a same start of injection timing. Plot 140 illustrates the resulting combustion of the narrower injection angle and plot 150 illustrates the resulting combustion of the wider injection angle. Plot 140 illustrates a more rapid and complete combustion event, wherein the narrower fuel permits rapid and thorough combustion of the fuel with oxygen throughout the combustion chamber due to utilizing spark assist to aid HCCI combustion.

FIG. 5 graphically illustrates the wider injection angle and narrower injection angle of FIG. 4, depicting IMEP through a series of combustion cycles wherein spark assist is utilized to aid combustion in HCCI combustion mode. The vertical y-axis depicts IMEP of the combustion cycle in kPa, and the horizontal x-axis depicts a series of sequential combustion cycles through which the IMEP values are collected. Plot 160 illustrates the resulting combustion of the wider injection angle and plot 170 illustrates the resulting combustion of the narrower injection angle. Plot 160 illustrates substantial variation in the work output of the resulting combustion, whereas plot 170, associated with the more narrow injection angle oriented toward the spark gap, illustrates more consistent IMEP values through the combustion cycles.

The angle of injection and the resulting spray envelope for fuel injected within a combustion chamber affects operation of combustion in an HCCI combustion mode, wherein greater dispersion of fuel associated with a wider injection angle promotes rapid and complete combustion and wherein a more focused direction of concentrated fuel toward a spark gap promotes stable combustion in a spark assist mode. A method to inject fuel into a combustion chamber is disclosed, wherein a portion of a total fuel mass to be injected within a combustion cycle is injected with a first narrower injection angle and a remaining portion of the total fuel mass is injected with a second wider injection angle. By directing fuel at the spark gap with a narrower injection angle and dispersing an amount of fuel throughout the combustion chamber with a wider injection angle, the combustion system can simultaneously achieve benefits of strong flame propagation associated with the narrower injection angle and stable auto-ignition associated with the wider injection angle.

Figure 6:
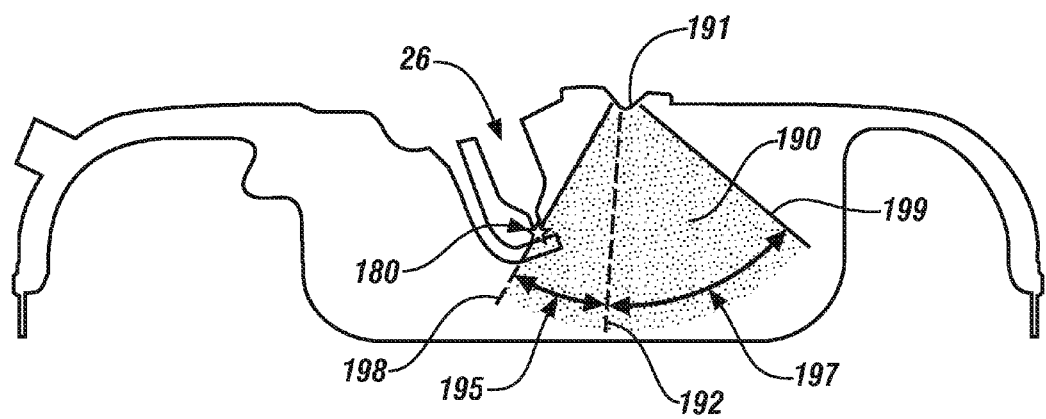
FIG. 6 illustrates an exemplary combustion chamber, in accordance with the present disclosure.

FIG. 6 illustrates a spray of fuel within an exemplary combustion chamber. Spark plug 26 includes spark gap 180 emanating from fuel injector tip 191. Fuel injector includes a spray axis 192 defined by a longitudinal axis of the injector or a centerline of the injector. A spray envelope of the spray of fuel 190 can be defined in profile by spray boundary 198 and spray boundary 199. The spray can exist as a filled cone-shaped spray with substantially even distribution of fuel droplets throughout the spray. In another embodiment, the spray can include an uneven distribution of fuel droplets, for example, with an increased concentration of fuel near the boundaries of the spray. The concentration of fuel in the spray can vary based upon a number of factors, including fuel pressure in a fuel delivery system, operation and geometry of the fuel injector, the specific composition of the fuel, and other factors known in the art. According to one embodiment, utilizing a spray envelope wherein the boundary 198 of the spray comes near or intersects the spark gap 180 of spark plug 26 can be advantageous to stable combustion. Spray 190 is not centered upon spray axis 192 of the injector. Angles 195 and 197 are illustrated and useful to describe an orientation of the spray in relation to spray axis 192. Spray 190 illustrates one of a plurality of sprays used in the methods of the disclosure.

Figure 7:
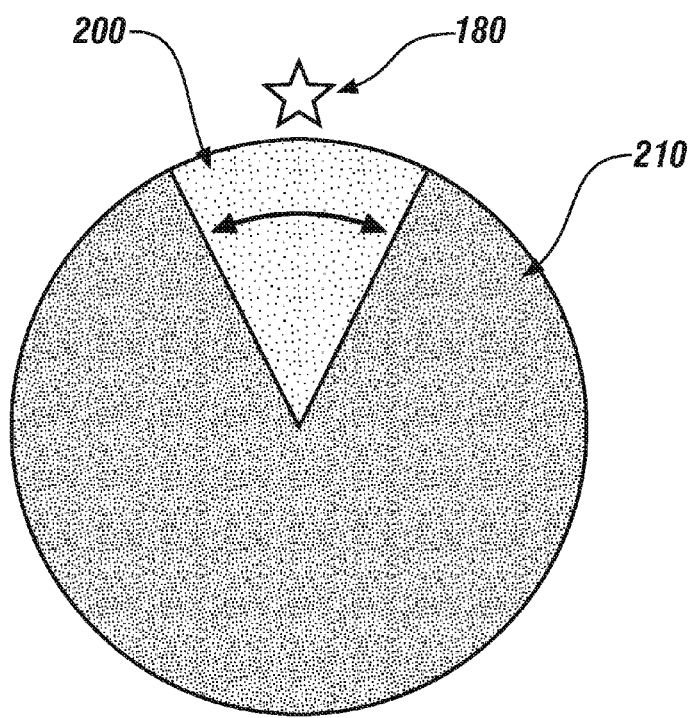
FIG. 7 illustrates an exemplary configuration to utilize a wider spray pattern and a narrower spray pattern, in accordance with the present disclosure.

FIG. 7 illustrates an exemplary configuration to utilize a wider spray pattern and a narrower spray pattern. The configuration illustrates how injector holes arrayed around a spray axis can be directed to achieve both a higher heat release rate associated with a wider injection angle and improved combustion stability while operating in HCCI combustion mode with spark assist. Arc 200 illustrates a region wherein fuel injection at the narrower fuel injection angle can be directed at spark gap 180. In one embodiment, the injector or injectors associated with arc 200 can be configured to inject between 20% and 30% of the total fuel mass to be injected in the current combustion cycle. Arc 210 illustrates a region wherein fuel injection at the wider fuel injection angle can be used to disperse a portion or the remaining portion of the total fuel mass to be injected throughout the combustion chamber.

Figure 8:
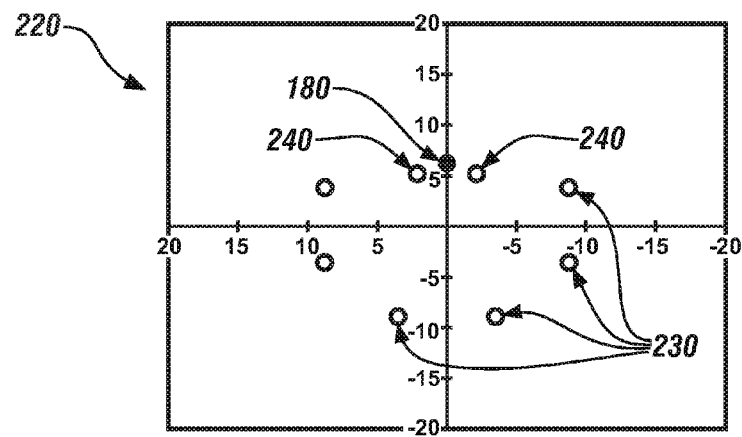
FIG. 8 illustrates an exemplary fuel injector configuration wherein a total of eight injector holes are utilized, in accordance with the present disclosure.
Figure 9:
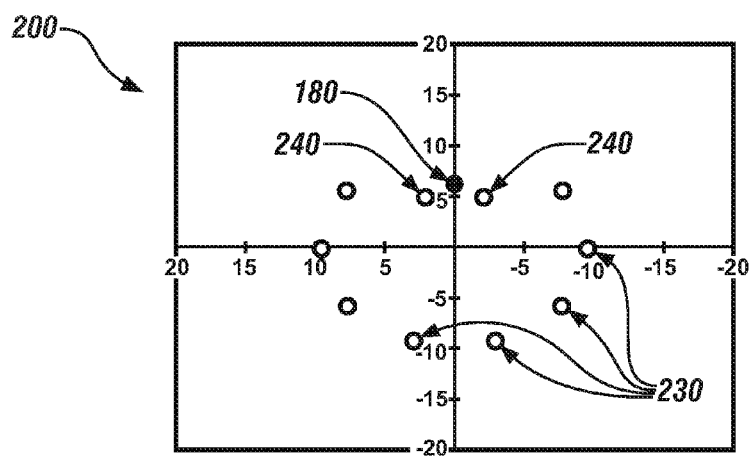
FIG. 9 illustrates an exemplary fuel injector configuration wherein a total of ten injector holes are utilized, in accordance with the present disclosure.

FIG. 8 illustrates an exemplary fuel injector configuration wherein a total of eight injector holes are utilized. Injector configuration 220 is illustrated. An angular location of spark gap 180 can be used to locate two injector holes 240 corresponding to the location of spark gap 180 configured for a narrower injection angle. Further, the location and orientation of the two injector holes 240 can be selected such that a spray envelope resulting from fuel injected through injector holes 240 each intersect the spark plug gap. Six injector holes 230 can be located elsewhere around the injector in regions not covered by injector holes 240. FIG. 9 illustrates an exemplary fuel injector configuration wherein a total of ten injector holes is utilized. Injector configuration 225 is illustrated. An angular location of spark gap 180 can be used to locate two injector holes 240 corresponding to the location of spark gap 180 configured for a narrower injection angle. Eight injector holes 230 can be located elsewhere around the injector in regions not covered by injector holes 240.

Configurations 220 and 225 are exemplary embodiments that injectors can utilize, wherein holes are arranged or dispersed equally or somewhat equally radially around the injector. However, a number of additional or alternative embodiments are envisioned. For example, any number of injector holes can be utilized with the narrower injection angle. Any number of injector holes can be utilized with the wider injection angle. The different injection patterns can be utilized. For example, holes with the wider injection angle can be utilized entirely around the injector, and additionally a hole or holes with the narrower injection angle can additionally be placed to direct a concentration of fuel to the spark gap. In one exemplary configuration, a hole with a narrow spray angle can be aligned directly with the spray axis of the injector, with the injector aligned to make the resulting spray interact with a spark gap of the spark plug as disclosed herein. In the same injector, one or more holes with a wide spray angle can additionally be positioned upon the injector to disperse fuel through a remainder of the combustion chamber, as disclosed herein. A number of configurations are envisioned, and the disclosure is not intended to be limited to the particular exemplary embodiments provided herein.

Figure 10:
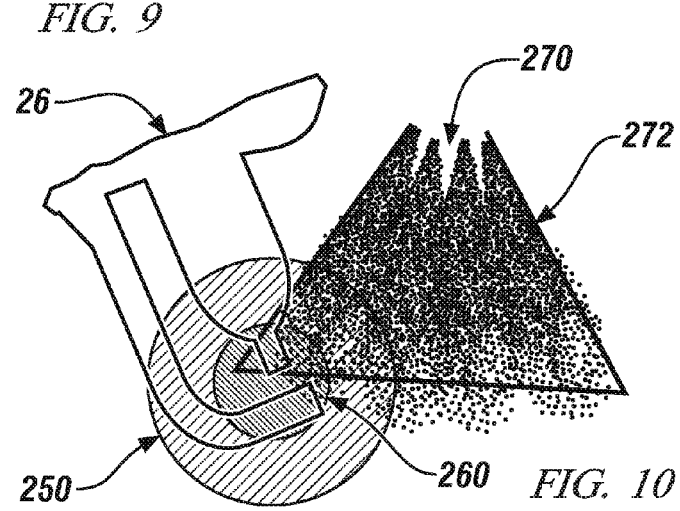
FIG. 10 illustrates an exemplary spark plug and regions defining exemplary proximity to the spark gap, in accordance with the present disclosure.

A spray of fuel can be directed to intersect or get sufficiently close to a spark gap to facilitate robust flame initiation. Directing fuel at the spark gap can include the spray envelope directly intersecting a center of the spark gap of the spark plug. Additionally or alternatively, other criteria for directing fuel at the spark gap can be defined. FIG. 10 illustrates an exemplary spark plug and regions defining exemplary proximity to the spark gap. Spark plug 26 is located proximate to spray 270 and corresponding spray envelope 272. Region 260 can be defined by a 2.5 mm radius from the center of the spark gap. Region 250 can be defined by a 5 mm radius from the spark gap. In one embodiment, directing fuel at the spark gap can require that spray envelope 272 sufficiently penetrate region 260. In another embodiment, directing fuel at the spark gap can require that a sufficient percentage of spray 270 fall within region 250. A number of methods can be used to determine an orientation of the fuel injectors to sufficiently direct fuel at the spark gap, and the disclosure is not intended to be limited to the particular exemplary embodiments provided herein.

Figure 11:
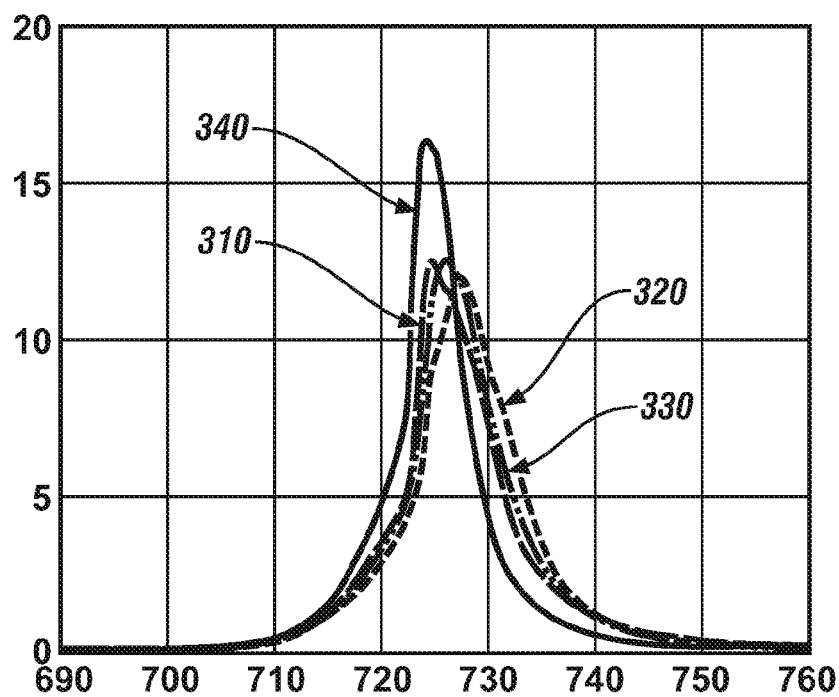
FIG. 11 illustrates results of computational models simulating combustion including heat release rates through a combustion cycle with different injector hole configurations, in accordance with the present disclosure.

FIG. 11 graphically illustrates results of computational models simulating combustion including heat release rates through a combustion cycle with different injector hole configurations. Plot 310 illustrates an injector utilizing only fuel injection with fuel injection angles of 90 degrees. Plot 320 illustrates an injector utilizing only fuel injection with fuel injection angles of 60 degrees. Plot 330 illustrates an injector configured according to the eight hole pattern of configuration 220. Plot 340 illustrates an injector configured according to the ten hole pattern of configuration 230. As anticipated from the related descriptions of FIGS. 2 and 4, plot 320 illustrates a peak lower than and later than the peak of plot 310. Plot 330 illustrates a peak similar to the peak of plot 310. Plot 340 illustrates a peak with a similar timing to the peak of plot 310, with the particular conditions of the simulation showing plot 340 to include a higher heat release rate for plot 340. Plots 330 and 340 show similar combustion results to plot 310.

Figure 12:
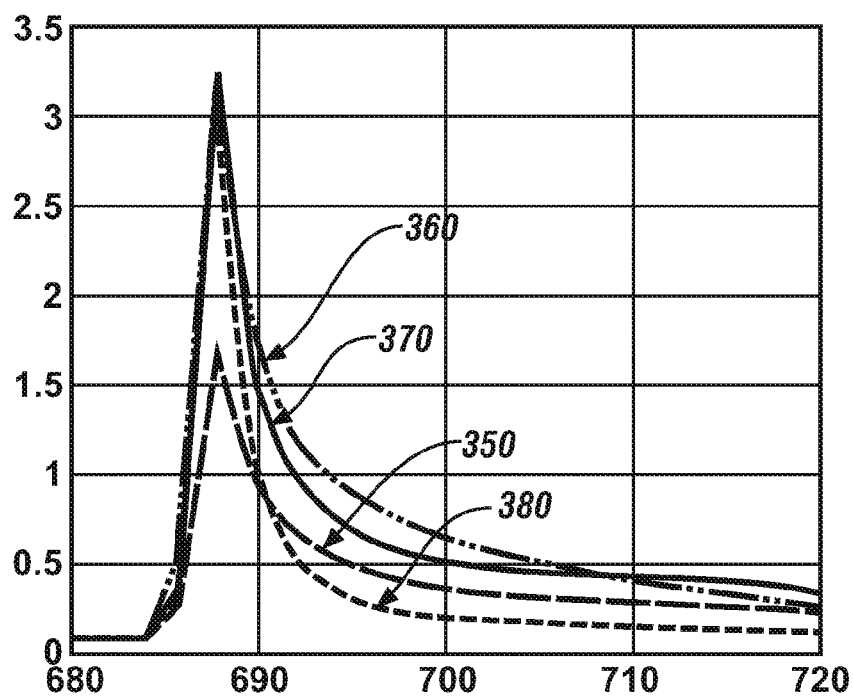
FIG. 12 illustrates results of computational models simulating a normalized indication of a fuel concentration achieved at the spark gap for each of a number of injector hole configurations, in accordance with the present disclosure.

FIG. 12 graphically illustrates results of computational models simulating a normalized indication of a fuel concentration achieved at the spark gap for each of a number of injector hole configurations. Plot 350 illustrates an injector utilizing only fuel injection with fuel injection angles of 90 degrees. Plot 380 illustrates an injector utilizing only fuel injection with fuel injection angles of 60 degrees. Plot 360 illustrates an injector configured according to the eight hole pattern of configuration 220. Plot 370 illustrates an injector configured according to the ten hole pattern of configuration 230. Plots 360, 370, and 380 indicate that the corresponding injector hole configurations similarly deliver a fuel concentration to the spark gap. Plot 350 indicates that the injector utilizing only fuel injection with fuel injection angles of 90 degrees fails to deliver a fuel concentration at the spark gap similar to the other configurations. As a result, the injector utilizing only fuel injection with fuel injection angles of 90 degrees is less likely to enable flame initiation in response to a spark as compared to the other injector configurations. Comparing conclusions that can be drawn from FIGS. 11 and 12, configurations 220 and 225, embodying configurations directing a portion of fuel at a spark gap of a spark plug and dispersing another portion of fuel throughout the combustion chamber achieve a heat release rate similar to an injector utilizing only fuel injection with fuel injection angles of 90 degrees and also deliver a fuel concentration at the spark gap similar to an injector utilizing only fuel injection with fuel injection angles of 60 degrees.

A fuel injection angle of 60 degrees is provided as an exemplary narrow fuel injection and a fuel injection angle of 90 degrees is provided as an exemplary wide fuel injection. These values and optimal selection thereof depend upon the dispersion of fuel in a particular combustion chamber and the specific configuration and operation of the combustion chamber. For example, FIG. 6 illustrates a piston with a cup shaped depression formed into the top of the piston. A number of different piston geometries are possible and may affect how injected fuel is dispersed throughout the combustion chamber. An orientation of the spray axis or the centerline of the fuel injector can affect optimal spray patterns. A distance between the fuel injector and the spark plug can affect optimal spray patterns. The examples provided include two injector patterns, a wide injection and a narrow injection. A plurality of different injection patterns can be used, for example, with a narrow injection pattern pointed toward a spark plug gap, a wide injection pattern spraying a diffused pattern of fuel, and an intermediate injection pattern spraying fuel in a semi-diffused pattern but oriented to project a spray of fuel toward a far end the combustion chamber. The fuel injector can be configured to spray the same pattern every time the fuel injector is cycled. In another embodiment, the holes in the tip of the fuel injector can be placed at different locations on the top of the fuel injector, such that different duty cycle control commands for the injector can vary a fuel dispersal pattern for a single injector based upon how the injector is cycled.

The embodiments disclosed utilize two injector holes with the narrow injection angle and either six or eight fuel injector holes with the wider injection angle. Based upon the fuel injector holes having substantially the same diameter and flow resistance, these hole configurations deliver approximately 20-30% of the fuel injection mass to the spark plug in the narrow spray envelope and second portion or a remainder of the fuel injection mass to the combustion chamber as dispersed fuel. The numbers of holes in utilizing each of the injection angles can be adjusted based upon a desired split in the fuel injection mass between the narrow spray envelopes directed at the spark plug and the dispersed fuel. The number of holes utilizing each of the injection angles can additionally be adjusted based upon different hole geometries and flow restrictions, for example, with a larger number of smaller diameter holes dispersing the portion of the fuel injection mass to be dispersed throughout the fuel injection chamber, with a smaller number of larger diameter holes directing a focused, narrow spray or sprays to the spark plug.

Throughout the disclosure, a hole located to an end of a fuel injector is used to create a fuel spray. In any embodiment disclosed herein, a hole is understood to include any fuel injector nozzle opening through which pressurized fuel within the injector flows and creates a spray of fuel within the associated combustion chamber. A hole or nozzle opening can be round. In the alternative, a hole or nozzle opening can be an oval, a slot, or any other complex shape. A spray resulting from a hole or nozzle opening will include properties affected by the shape, size, orientation, or other properties of the hole or nozzle opening, such properties including a shape of the spray envelope, size of the droplets created, and velocity of the droplets in the spray.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A fuel injector receiving a flow of pressurized fuel and providing fuel injections directly into a combustion chamber of an internal combustion engine, the fuel injector comprising:
   a first fuel injection nozzle opening of the fuel injector directing with a first narrow injection angle a first portion of a fuel injection mass at a spark gap of a spark plug; and
   a second fuel injection nozzle opening of the fuel injector dispersing with a second wider injection angle a second portion of the fuel injection mass within the combustion chamber in an evenly distributed conical spray plume throughout the combustion chamber, such that the fuel injector may simultaneously direct the first portion of the fuel injection mass and the second portion of the fuel injection mass at differing injection angles.

2. The fuel injector of claim 1, further comprising:
   a plurality of fuel injection nozzle openings dispersing with the second wider injection angle the second portion of the fuel injection mass within the combustion chamber.

3. The fuel injector of claim 1, further comprising:
   a first plurality of fuel injection nozzle openings directing with the first narrow injection angle the first portion of the fuel injection mass at the spark gap; and
   a second plurality of fuel injection nozzle openings dispersing with the second wider injection angle the second portion of the fuel injection mass within the combustion chamber.

4. The fuel injector of claim 3, wherein the fuel injection nozzle openings are dispersed radially around a tip of the fuel injector; and
   wherein the first plurality of fuel injector nozzle openings are oriented toward the spark plug.

5. The fuel injector of claim 3, wherein the first plurality of fuel injector nozzle openings comprises two fuel injector nozzle openings oriented towards the spark plug; and
   wherein the second plurality of fuel injector nozzle openings comprises six fuel injector nozzle openings.

6. The fuel injector of claim 3, wherein the first plurality of fuel injector nozzle openings comprises two fuel injector nozzle openings oriented towards the spark plug; and
   wherein the second plurality of fuel injector nozzle openings comprises eight fuel injector nozzle openings.

7. The fuel injector of claim 3, wherein the first portion of the fuel injection mass comprises between twenty and thirty percent of the fuel injection mass.

8. The fuel injector of claim 1, wherein the first narrow injection angle creates a spray with a 60 degree fuel injection envelope.

9. The fuel injector of claim 1, wherein the second wider injection angle creates a spray with a 90 degree fuel injection envelope.

10. The fuel injector of claim 1, wherein the first fuel injector nozzle opening creates a spray with a fuel injection envelope intersecting the spark gap.

11. The fuel injector of claim 1, wherein the fuel injector nozzle openings are round holes.

12. A fuel injector receiving a flow of pressurized fuel and providing fuel injections directly into a combustion chamber of an internal combustion engine, the fuel injector comprising:
   two fuel injector holes directing a first portion of a fuel injection mass at a spark gap of a spark plug, wherein the two fuel injector holes each create a spray with a 60 degree fuel injection envelope; and
   a plurality of wide angle fuel injector holes dispersing a remainder of the fuel injection mass within the combustion chamber, wherein each of the plurality of wide angle fuel injector holes create a spray with a 90 degree fuel injection envelope;
   wherein the fuel injector may simultaneously direct the first portion of the fuel injection mass and the second portion of the fuel injection mass at differing injection angles, in an evenly distributed conical spray plume throughout the combustion chamber.

13. Method to inject fuel with a fuel injector into a combustion chamber of an internal combustion engine, the method comprising:
   directing with a first narrow injection angle a first portion of a fuel injection mass at a spark gap of a spark plug; and
   dispersing with a second wider injection angle a remaining portion of the fuel injection mass within the combustion chamber such that the fuel injector is simultaneously directing the first portion of the fuel injection mass and the second portion of the fuel injection mass at differing injection angles, in an evenly distributed conical spray plume throughout the combustion chamber.

14. The method of claim 13, wherein directing the first portion comprises directing a spray envelope to intersect the spark plug gap.

15. The method of claim 13, wherein directing the first portion comprises creating a spray of fuel from each of two fuel injector holes, wherein each spray envelope intersects the spark plug gap.

* * * * *